(12) United States Patent
Scardicchio et al.

(10) Patent No.: US 6,910,863 B2
(45) Date of Patent: Jun. 28, 2005

(54) METHODS AND APPARATUS FOR ASSEMBLING A BEARING ASSEMBLY

(75) Inventors: Ubaldo M. Scardicchio, Cincinnati, OH (US); Michael Slusher, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 10/316,799

(22) Filed: Dec. 11, 2002

(65) Prior Publication Data

US 2004/0115041 A1 Jun. 17, 2004

(51) Int. Cl.⁷ .............................................. F03D 00/00
(52) U.S. Cl. ............................................ 416/1; 415/110
(58) Field of Search ................................ 415/110, 111, 415/174.2, 113, 170.1, 229; 416/1

(56) References Cited

U.S. PATENT DOCUMENTS 4,289,360 A     9/1981  Zirin
4,687,346 A     8/1987  Suciu
4,872,767 A    10/1989  Knapp
5,247,855 A     9/1993  Alten et al.
5,361,580 A    11/1994  Ciokajlo et al.
6,099,165 A  *  8/2000  Tremaine ......................... 384/99
6,109,022 A  *  8/2000  Allen et al. ....................... 60/223
6,240,719 B1 *  6/2001  Vondrell et al. ................. 60/223
6,261,061 B1    7/2001  Pfaffenberger
6,443,698 B1 *  9/2002  Corattiyil et al. ................ 416/1

* cited by examiner

*Primary Examiner*—Edward K. Look
*Assistant Examiner*—James M. McAleenan

(57) ABSTRACT

A bearing assembly for a gas turbine engine rotor includes a damper bearing configured to support the rotor, a bearing centering sub-assembly configured to position the damper bearing relative to the rotor, and a retainer. The damper bearing includes a frame that defines a bearing bore, an inner race, and an outer race, said inner and outer races within said bearing bore. The bearing centering apparatus sub-assembly includes a plurality of first springs and a plurality of second springs. The retainer is coupled to the bearing housing and is configured to maintain an axial position of the bearing outer race with respect to the support structure.

20 Claims, 4 Drawing Sheets

METHODS AND APPARATUS FOR ASSEMBLING A BEARING ASSEMBLY

BACKGROUND OF THE INVENTION

This application relates generally to gas turbine engine rotor assemblies and, more particularly, to bearing assemblies for gas turbine engine rotor assemblies.

Gas turbine engines typically includes a fan rotor assembly, a compressor, and a turbine. The fan rotor assembly includes a fan including an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements located within an inner race and an outer race.

Additionally, at least some known damper bearing assemblies include a plurality of springs attached between the bearing outer race and a mounting flange. The springs support the bearing and act as an antirotation device that substantially prevents the bearing outer race from rotating with respect to a bearing support. Because the strength and effectiveness of the antirotation device is limited by the stiffness requirement of the bearing support, at least some known bearing supports include a catcher device that is coupled to the bearing assembly to substantially limit aft movement of the bearing outer race with respect to the bearing support if high dynamic loading is induced into the bearing assembly.

At least some known damper bearing assemblies are positioned within sumps, and space limitations within the sump do not enable a catcher device to be coupled to the bearing assembly without expensive design modifications. Furthermore, because such bearing assemblies are positioned in the sumps, such assemblies may be exposed to high operating temperatures and soakback conditions, and thus may require costly seal assemblies to facilitate preventing sump oil leakage.

BRIEF DESCRIPTION OF THE INVENTION

In one aspect a method for assembling a gas turbine engine rotor assembly is provided. The engine includes a rotor shaft and a bearing assembly that includes an annular damper bearing and an annular spring. The method comprises forming at least one groove that is defined within and extends partially circumferentially around at least one of the annular damper and the annular spring, supporting the rotor shaft with the annular spring, and coupling the annular damper bearing to the annular spring using the at least one groove such that the spring extends circumferentially between the damper bearing and the rotor shaft.

In another aspect of the invention, a bearing assembly for a gas turbine engine rotor is provided. The bearing assembly includes an annular spring and an annular damper bearing. The annular spring is configured to support the gas turbine engine rotor. The annular damper bearing is concentrically aligned with the annular spring, and is radially outward from said annular spring, such that the damper bearing supports the spring. At least one of the damper bearing and the spring includes at least one groove defined therein. At least one of the damper bearing and the spring includes a retainer extending therefrom. The at least one groove is sized to receive the retainer therein for coupling the damper bearing to the spring.

In yet a further aspect, a rotor assembly is provided. The rotor assembly includes a rotor shaft and a bearing assembly. The bearing assembly supports the rotor shaft, and includes an annular damper bearing and an annular spring. The damper bearing extends circumferentially around the spring such that the spring is between the damper bearing and the rotor shaft. At least one of the damper bearing and the spring includes at least one groove defined therein for slidably coupling the damper bearing to the spring.

DETAILED DESCRIPTION OF THE INVENTION

Figure 1:
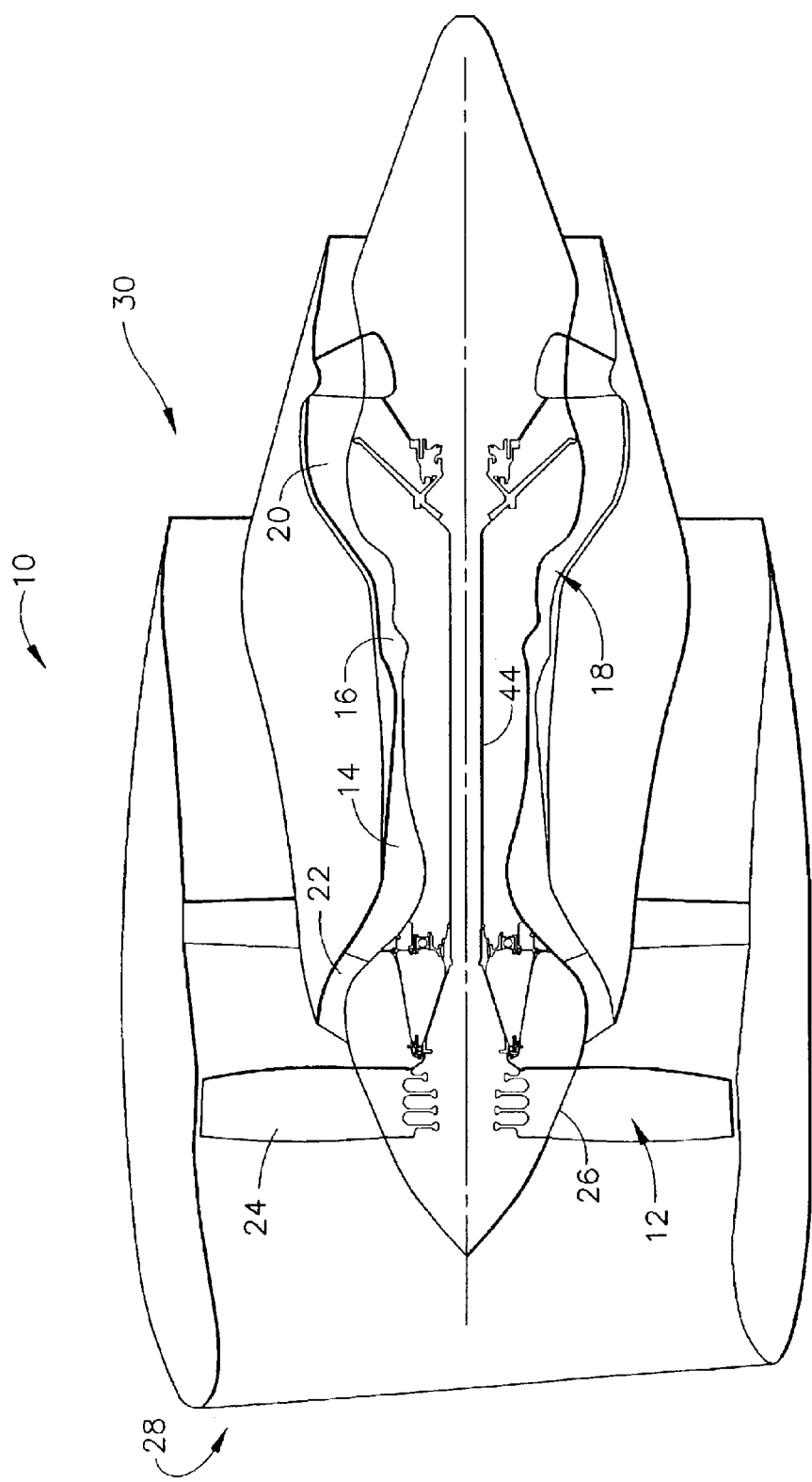
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
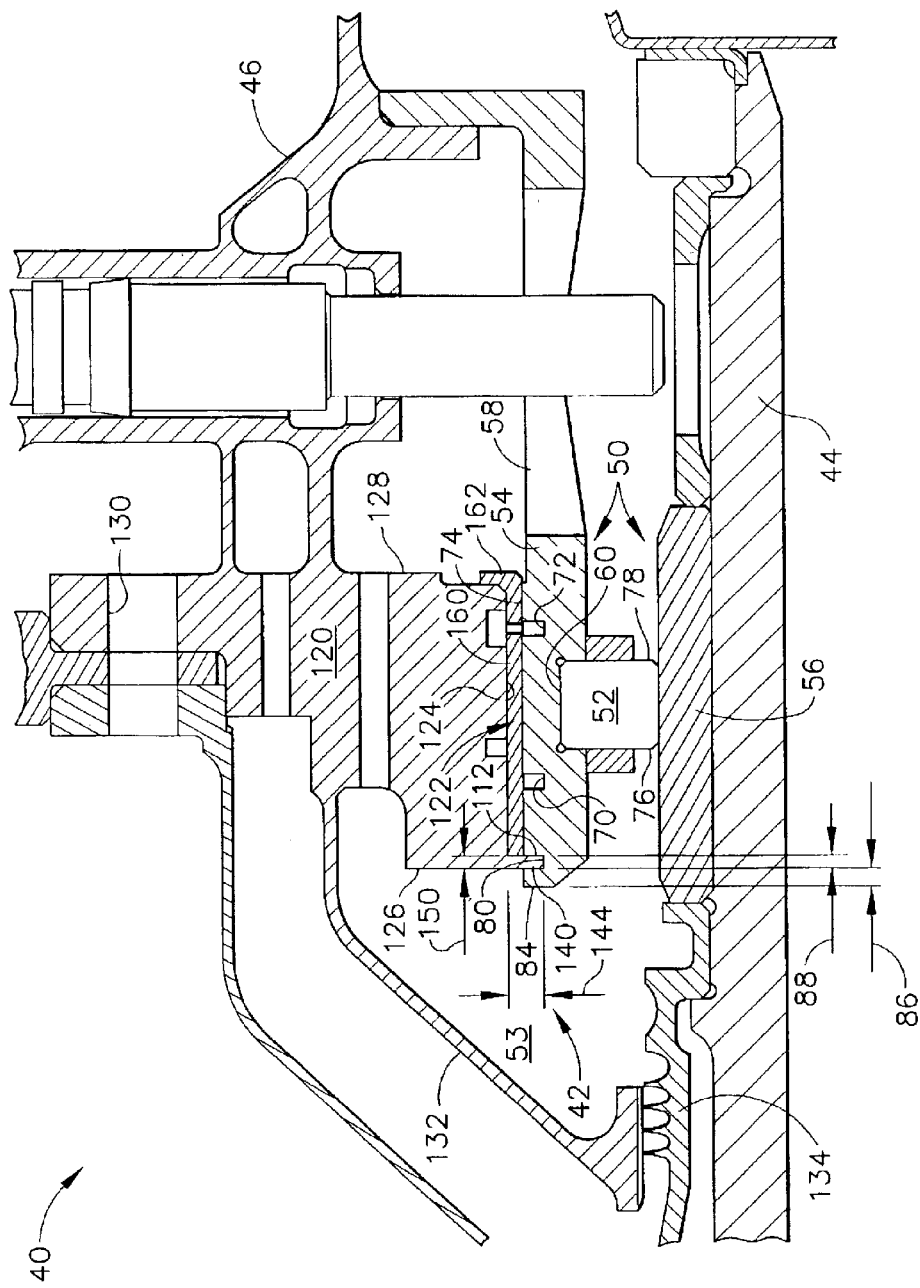
FIG. 2 is a cross-sectional view of a rotor assembly that may be used in the gas turbine engine shown in FIG. 1.
Figure 3:
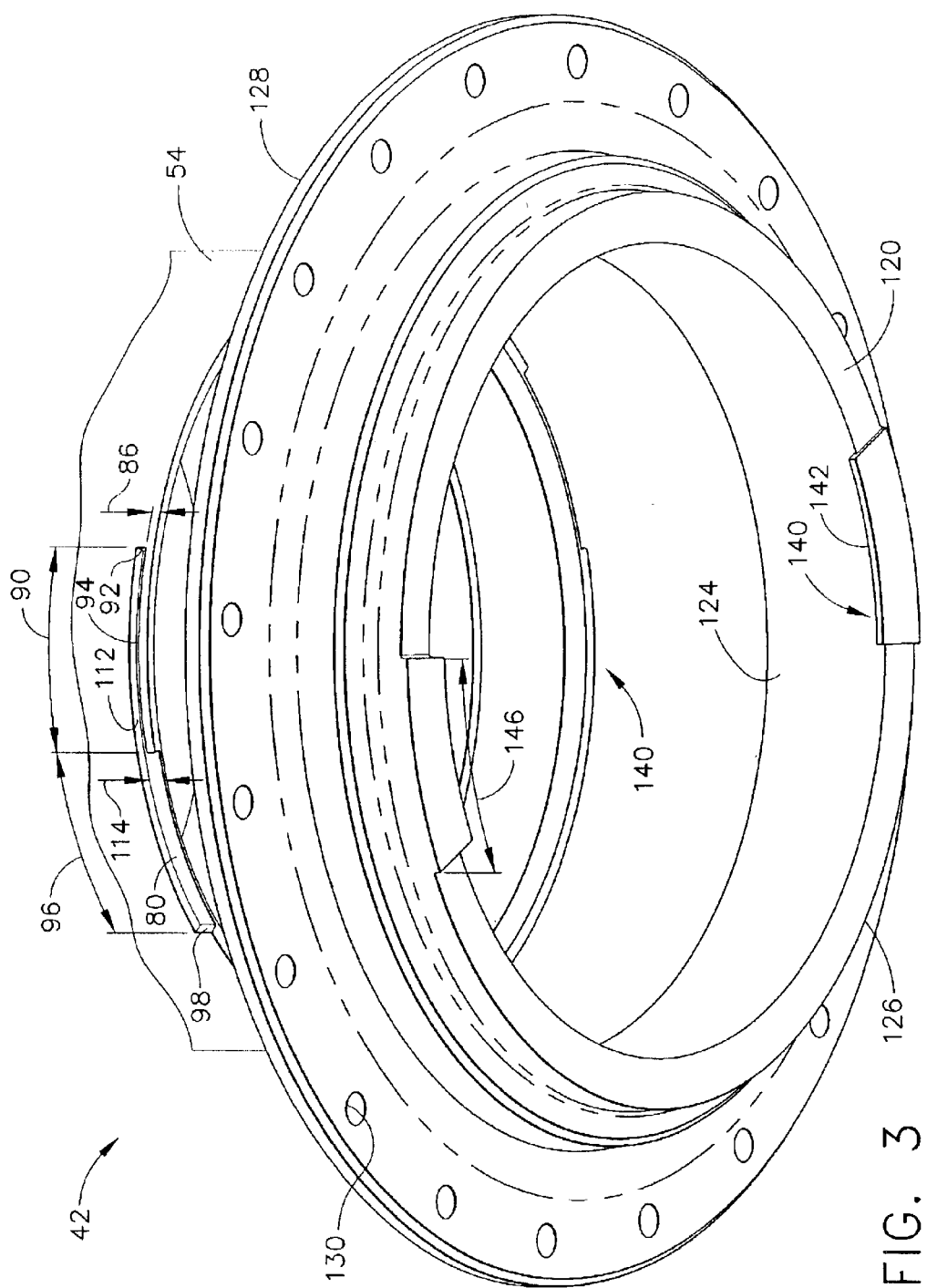
FIG. 3 is a partial perspective view of an exemplary unassembled bearing assembly used with the rotor assembly shown in FIG. 2.
Figure 4:
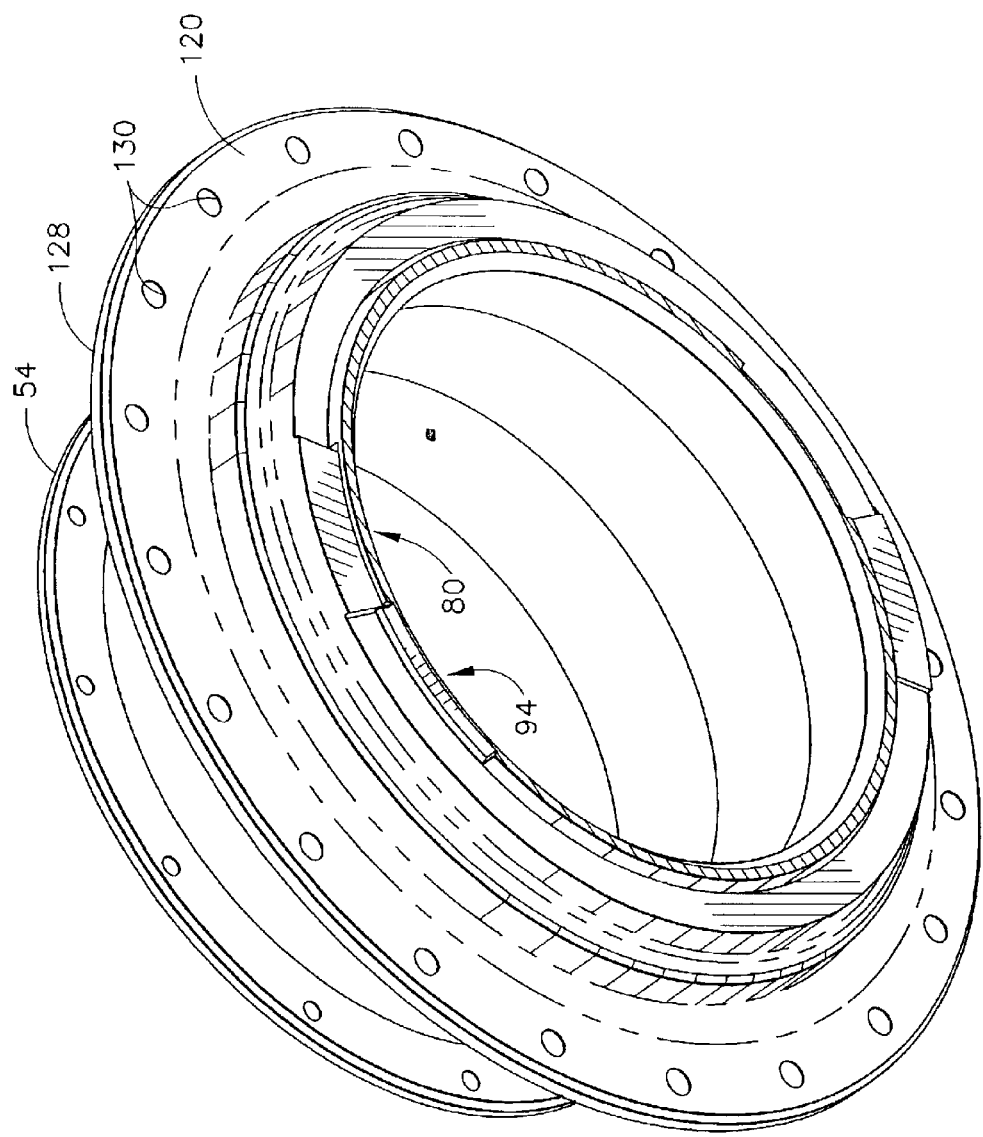
FIG. 4 is a partial perspective view of the bearing assembly shown in FIG. 3 in an assembled configuration.

FIG. 2 is a cross-sectional view of an exemplary embodiment of a rotor assembly 40 that may be used with a gas turbine engine, such as engine 10 shown in FIG. 1. FIG. 3 is a partial perspective view of an exemplary unassembled bearing assembly 42 that may be used with rotor assembly 40, and FIG. 4 is a partial perspective view of bearing assembly 42 shown in an assembled configuration. In one embodiment, the gas turbine engine is an LMX 7000 available from General Electric Company, Cincinnati, Ohio. Rotor and bearing assembly 40 includes a rotor shaft 44 which supports an array of fan blades 24 (shown in FIG. 1) that extend radially outward from rotor disc 26. Rotor shaft 44 is rotatably secured to a structural support frame 46 with a plurality of bearing assemblies 42 that support rotor shaft 44. In the exemplary embodiment, bearing assembly 42 is a damper bearing assembly, and support frame 46 is a sump housing.

Bearing assembly 42 includes a paired race 50 and a rolling element 52, positioned within a sump 53 radially bounded by shaft 44 and housing 46. Paired race 50 includes an outer race 54 and an inner race 56 that is radially inward from outer race 54. Rolling element 52 is located between inner race 56 and outer race 54. Outer race 54 is formed integrally with a plurality of spring fingers 58, such that a face 60 of outer race 54 is positioned in rollable contact with rolling element 52. Spring fingers 58 are spaced circumferentially around shaft 44. In an alternative embodiment, fingers 58 are coupled to outer race 54.

Outer race 54 includes a pair of annular grooves 70 and 72 that are defined in a radially outer surface 74 of outer race 54. More specifically, grooves 70 and 72 extend radially inwardly from spring finger member outer surface 74 and are positioned respectively upstream and downstream from an upstream side 76 and a downstream side 78 of outer race 54.

Outer race 54 also includes at least one retainer groove 80 that extends radially inwardly from outer surface 74, such that retainer groove 80 is aligned substantially perpendicularly to an axis of rotation of rotor assembly 40. In one embodiment, groove 80 is formed by machining. Retainer groove 80 is arcuate and extends only partially circumferentially around spring finger member 58. More specifically, retainer groove 80 is positioned between groove 70 and an upstream edge 84 of outer race 54, such that retainer groove 70 is a distance 86 from member edge 84. In the exemplary embodiment, outer race 54 includes a pair of identical grooves 80 that are oppositely positioned and are offset from each other by approximately 180°. In an alternative embodiment, race 54 includes more than two grooves 80.

Each groove 80 has a width 88, and an arcuate length 90 that is measured between a stop edge 92 and an entrance slot 94. Entrance slot 94 extends partially circumferentially from groove 80, and is radially aligned with respect to groove 80. In one embodiment, slot 94 is formed by machining. More specifically, entrance slot 94 is aligned substantially perpendicularly to the axis of rotation of rotor assembly 40, and has an arcuate length 96 measured between groove 80 and a stop edge 98. Entrance slot 94 extends aftward from member upstream edge 84 to an aft wall 112 that defines an aft wall of both groove 80 and slot 94. Accordingly, a width 114 of entrance slot 94 is larger than groove width 88.

An annular damper bearing 120 is positioned radially outwardly from outer race 54 such that a gap 122 is defined between a radially inner surface 124 of damper bearing 120 and outer race surface 74. Damper bearing 120 includes an upstream side 126 and a downstream side 128. In the exemplary embodiment, edge 128 includes a plurality of openings 130 extending therethrough for receiving fasteners (not shown) for coupling damper bearing 120 to housing 44. Damper bearing 120 also includes a seal member 132 that is integrally formed with damper bearing 120 and mates with seal teeth 134 extending from a rotating air/oil seal.

Damper bearing 120 is coupled to spring finger member 58 by a pair of identical retainers 140 that each extend radially inwardly from damper bearing 120, such that each retainer 140 defines a portion of gap 122. In the exemplary embodiment, retainers 140 are formed integrally with damper bearing 120. In an alternative embodiment, retainers 140 are coupled to damper bearing 120. More specifically, each retainer 140 extends radially inwardly from damper bearing upstream edge 126 such that an inner edge 142 of each retainer 140 is a distance 144 from damper bearing radially inner surface 124. In the exemplary embodiment, retainers 140 are offset from each other by approximately 180°.

Each retainer 140 has an arcuate length 146 that is smaller than groove arcuate length 90 and slot arcutate length 96. Additionally, each retainer 140 has a thickness 150 that is slightly smaller than groove width 88. In an alternative embodiment, damper bearing 120 includes more than two retainers 140.

A sleeve damper 160 is positioned between damper bearing 120 and outer race 54. Specifically, sleeve damper 160 is annular and extends aftward from retainers 140 through gap 122 between spring finger member 58 and damper bearing 120. Sleeve damper 160 includes an annular alignment lip 162 that extends radially outwardly from damper downstream side 128.

During assembly of rotor assembly 40, outer race 54 is positioned circumferentially around shaft 44 such that shaft 44 is rotatably coupled to outer race 54. Sleeve damper 160 is then positioned circumferentially around outer race 54. Damper bearing 120 is then positioned upstream from outer race 54 such that retainers 140 are aligned substantially circumferentially with respect to outer race entrance slots 94, as shown in FIG. 3. Damper bearing 120 is then guided aftward and coupled to sump housing 44 such that retainers 140 are received within entrance slots 94. Outer race 54 is then rotated such that retainers 140 are circumferentially guided into grooves 80 and secured using fasteners that extend through openings 130. When retainers 140 are fully received within grooves 80, as shown in FIG. 4, because a tight tolerance is defined between grooves 80 and retainers 140, grooves 80 facilitate retaining damper bearing 120 being coupled to outer race 54.

During engine operation, springs 58 facilitate supporting bearing assembly 42 such that shaft 46 is substantially centered within outer race 54 with a desired radial stiffness. However, due to damper radial clearance, an engine unbalance may cause outer race 54 to orbit within housing 46. The orbiting produces a torque through springs 58 called harmonic drive. Retainers 140 facilitate preventing springs 58 and outer race 54 from deflecting above a yield limit of the material used in fabricating springs 58 and outer race 54. More specifically, retainers 140 facilitate limiting circumferential motion of outer race 54, as well as maintaining an axial position of outer race 54 such that radial loading from rotor assembly 40 is transmitted into frame 46. Accordingly, because axial movement of outer race 54 is facilitated to be reduced, inadvertent contact between rotor shaft 44 and frame 46 is facilitated to be prevented post spring failure. As a result, retainers 140 facilitate extending a useful life of bearing assembly 40 in a cost-effective and reliable manner.

The above-described rotor assembly is cost-effective and highly reliable. The rotor assembly includes a pair of retainers that extend radially inwardly from the damper bearing and into calibrated slots defined on the spring finger member. The retainers facilitate maintaining an axial position of the outer race relative to the support frame. Accordingly, radial loading induced to the bearing assembly is transmitted into the frame, and inadvertent contact between the rotor shaft and the frame is prevented. As a result, the retainers facilitate extending a useful life of the bearing assembly when the engine is operating.

Exemplary embodiments of rotor assemblies are described above in detail. The rotor assemblies are not limited to the specific embodiments described herein, but rather, components of each assembly may be utilized independently and separately from other components described herein. Each rotor assembly component can also be used in combination with other rotor assembly components.

While the invention has been described in terms of various specific embodiments, those skilled in the art will recognize that the invention can be practiced with modification within the spirit and scope of the claims.

What is claimed is:

1. A method for assembling a gas turbine engine rotor assembly, the engine including a rotor shaft and a bearing assembly including an annular damper bearing and an annular spring, said method comprising:

forming at least one groove that is defined within and extends partially circumferentially around at least one of the annular damper and the annular spring;

forming at least one retainer tab extending from at least one of the annular damper and the annular spring;

supporting the rotor shaft with the annular spring;

coupling the annular damper bearing to the annular spring by coupling the at least one retainer tab to the at least one groove such that the spring extends circumferentially between the damper bearing and the rotor shaft and such that circumferential movement of the annular spring with respect to the annular damper bearing is facilitated to be prevented.

2. A method in accordance with claim 1 wherein coupling the annular damper bearing to the annular spring further comprises slidably coupling the damper bearing to the spring such that a circumferential gap is defined between the spring and the damper bearing.

3. A method in accordance with claim 2 further comprising coupling an annular sleeve damper to the annular spring such that the sleeve damper extends through the gap defined between the spring and damper bearing.

4. A method in accordance with claim 1 wherein coupling the annular damper bearing to the annular spring comprises:
   inserting the retainer tab into a slot defined in communication with the at least one groove; and
   rotating the damper bearing with respect to the annular spring to secure the retainer tab within the at least one groove.

5. A method in accordance with claim 1 wherein forming at least one groove that is defined within and extends partially circumferentially around at least one of the annular damper and the annular spring further comprises forming at least a first groove and a second groove within the annular spring, wherein the first groove is offset approximately 180° from said second groove.

6. A bearing assembly for a gas turbine engine rotor, said bearing assembly comprising:
   an annular spring configured to support the gas turbine engine rotor; and
   an annular damper bearing concentrically aligned with said annular spring, said damper bearing radially outward from said annular spring and configured to support said spring, at least one of said damper bearing and said spring comprising at least one groove defined therein, at least one of said damper bearing and said spring comprising a retainer extending therefrom, said at least one groove sized to receive said retainer therein for coupling said damper bearing to said spring.

7. A bearing assembly in accordance with claim 6 wherein said retainer extends radially inwardly from at least one of said spring and said damper bearing.

8. A bearing assembly in accordance with claim 6 wherein said at least one groove extends partially circumferentially around at least one of said spring and said damper.

9. A bearing assembly in accordance with claim 6 wherein said at least one groove comprises a first groove and a second groove, said first groove offset approximately 180° from said second groove.

10. A bearing assembly in accordance with claim 6 further comprising an annular sleeve damper extending circumferentially between said spring and said damper.

11. A bearing assembly in accordance with claim 6 wherein said retainer is configured to slidably couple within said at least one groove to facilitate preventing circumferential movement of said spring with respect to said damper bearing.

12. A bearing assembly in accordance with claim 6 wherein at least one of said damper bearing and said spring further comprises an air/oil seal member.

13. A bearing assembly in accordance with claim 6 wherein said retainer extends radially inwardly from said damper bearing, said at least one groove defined in a radially outer surface of said spring, said damper bearing configured to slidably couple to said spring by said retainer such that an annular gap is defined between said spring and said damper bearing.

14. A rotor assembly comprising:
   a rotor shaft; and
   a bearing assembly configured to support said rotor shaft, said bearing assembly comprising an annular damper bearing and an annular spring, said damper bearing extending circumferentially around said spring such that said spring is between said damper bearing and said rotor shaft, at least one of said damper bearing and said spring comprising at least one groove defined therein, at least one of said bearing assembly damper bearing and said spring comprises at least one retainer extending outwardly therefrom, said at least one groove and said at least one retainer facilitate slidably coupling said damper bearing to said spring.

15. A rotor assembly in accordance with claim 14 wherein said at least one groove sized to receive said retainer therein for coupling said damper bearing to said spring.

16. A rotor assembly in accordance with claim 15 wherein bearing assembly at least one retainer extends radially inwardly from at least one of said spring and said damper bearing towards said rotor shaft.

17. A rotor assembly in accordance with claim 14 wherein said bearing assembly at least one groove extends partially circumferentially around at least one of said spring and said damper bearing, said damper bearing coupled to said spring such that a gap is circumferentially defined therebetween.

18. A rotor assembly in accordance with claim 17 further comprising an annular sleeve damper extending circumferentially between said bearing assembly spring and said damper within said gap.

19. A rotor assembly in accordance with claim 14 wherein said at least one groove is defined in a radially outer surface of said spring, said damper bearing configured to slidably couple within said at least one groove to facilitate preventing rotational movement of said spring with respect to said damper bearing.

20. A rotor assembly in accordance with claim 14 wherein said bearing assembly at least one groove configured to facilitate preventing circumferential movement of said bearing assembly spring with respect to said damper bearing, said at least one groove extending partially circumferentially from a slot that has a width that is wider than a width of said at least one groove.

* * * * *